(12) United States Patent
Garaga et al.

(10) Patent No.: US 11,943,323 B2
(45) Date of Patent: *Mar. 26, 2024

(54) CONTENT MANAGEMENT SYSTEM FRAMEWORK FOR CLOUD DEPLOYMENT AND OPERATION AS MICROSERVICES

(71) Applicant: OPEN TEXT HOLDINGS, INC.

(72) Inventors: Pulla Rayudu Garaga, Bengaluru (IN); Ananda Reddy Chichhili, Bangalore (IN)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/963,902

(22) Filed: Oct. 11, 2022

(65) Prior Publication Data

US 2023/0029601 A1 Feb. 2, 2023

Related U.S. Application Data

(63) Continuation of application No. 16/886,101, filed on May 28, 2020, now Pat. No. 11,496,607.

(51) Int. Cl.
| | |
|---|---|
| *H04L 67/63* | (2022.01) |
| *G06F 9/4401* | (2018.01) |
| *G06F 9/445* | (2018.01) |
| *H04L 41/0806* | (2022.01) |
| *H04L 41/0866* | (2022.01) |

(Continued)

(52) U.S. Cl.
CPC ............ *H04L 67/63* (2022.05); *G06F 9/4401* (2013.01); *G06F 9/44505* (2013.01); *H04L 41/0806* (2013.01); *H04L 41/0866* (2013.01); *H04L 49/9084* (2013.01); *H04L 67/10* (2013.01)

(58) Field of Classification Search
CPC ............... H04L 67/327; H04L 41/0806; H04L 41/0866; H04L 49/9084; H04L 67/10; H04L 41/085; G06F 9/4401; G06F 9/44505

See application file for complete search history.

(56) References Cited

U.S. PATENT DOCUMENTS

| | | | |
|---|---|---|---|
| 10,684,895 B1 * | 6/2020 | Goel | G06F 9/455 |
| 2021/0182246 A1 * | 6/2021 | Foque | G06F 16/2365 |
| 2021/0365332 A1 * | 11/2021 | Wang | G06F 11/1474 |

* cited by examiner

*Primary Examiner* — Michael A Keller
(74) *Attorney, Agent, or Firm* — SPRINKLE IP LAW GROUP

(57) ABSTRACT

The disclosure provides a new content server framework in which functionalities of a content server are implemented as lightweight microservices. At startup of the content server framework, a content server container and a set of microservices are launched. The content server container only has a content server application programming interface (API) which has a controller that can instantiate controller applications, each having a master module and worker(s). When a request is received, the content server API routes it to an appropriate microservice which stores the request in a repository. The master module retrieves the request from the repository and places it in a queue. The worker picks up the request from the queue and processes it. The controller keeps track of details of each controller application container that it instantiated (e.g., load and status) and automatically scale up or down the number of instances.

20 Claims, 4 Drawing Sheets

(51) Int. Cl.
*H04L 49/90* (2022.01)
*H04L 67/10* (2022.01)

CONTENT MANAGEMENT SYSTEM FRAMEWORK FOR CLOUD DEPLOYMENT AND OPERATION AS MICROSERVICES

CROSS-REFERENCE TO RELATED APPLICATIONS

This application is a continuation of, and claims a benefit of priority under 35 U.S.C. 120 of the filing date of U.S. patent application Ser. No. 16/886,101, filed May 28, 2020, entitled "CONTENT MANAGEMENT SYSTEM FRAMEWORK FOR CLOUD DEPLOYMENT AND OPERATION AS MICROSERVICES," issued as U.S. Pat. No. 11,496,607, the entire contents of which are hereby expressly incorporated by reference for all purposes.

TECHNICAL FIELD

This disclosure relates generally to the field of content management. More particularly, this disclosure relates to systems, methods, and computer program products for providing a framework for content management system cloud deployment and operation as microservices.

BACKGROUND OF THE RELATED ART

Content management refers to the creation and modification of digital content. A content management system refers to a computer system that can be used to manage the creation and modification of digital content. Traditionally, a content management system operates the premises of an enterprise, generally at the backend of a secure enterprise computing network.

Cloud computing refers to the on-demand availability of computer system resources, particularly data storage and computational power of data centers. End users are generally not involved in the direct, active management of cloud computing.

From the perspective of an enterprise, moving content management to the cloud can provide some flexibility in customization and integrations. However, deploying an enterprise-class content management (ECM) system to the cloud and operating it in a cloud computing environment can impose major obstacles.

For instance, currently, an ECM server can provide many features as a monolithic structure containing all of the following components: workflow, federation, migration, log purge, filescan, audit-trail, job scheduler, method launcher, audit purge, and replication module. Due to this monolithic structure, an ECM server deployment size can be massive and, consequently, more memory and storage space would be required while deploying and operating the ECM server (in any computing environment). Further, if load is more for a specific component, an administrator needs to enable the load balancing, high availability feature before deploying a new instance of the ECM server. Accordingly, a new machine with a huge amount of RAM and storage space is usually required in order to deploy a new instance of an ECM server. Even in the case that the load is reduced, the ECM server still runs and consumes a huge amount of resources.

In view of the foregoing, there is room for innovations and improvements for providing content management in a cloud environment.

SUMMARY OF THE DISCLOSURE

Embodiments disclosed herein are directed to a new content management framework that can support an enterprise-class content management system (referred to herein as a content server) deployment and operation through a microservices architecture. As alluded to above, currently, the container size for an ECM server can be huge, with a minimum size of two-gigabyte (GB) and requires at least 8 GB of random access memory (RAM) to run.

This monolithic ECM architecture makes scaling and load balancing difficult. Even if load is reduced or not an issue, running a monolithic ECM server can still consume a huge amount of resources (e.g., storage space, RAM, etc.). To this end, the new, more modular content management framework design is more efficient in that the functionalities (i.e., workflow, federation, migration, log purge, file scan, audit-trail, job scheduler, method launcher, audit purge, and replication) of an ECM server are implemented as lightweight microservices.

The new framework mainly has two modules: an application controller module and a master worker module. The application controller module mainly creates instances of active controller applications (each running in a lightweight container less than 1 GB, approximately 50% reduction in container size) and monitors the load and status of each container. The master worker module has one master and 1-n worker(s) to handle the load.

In embodiments disclosed herein, when an instance of a controller application (e.g., a content server, which is a server process that handles database session in-memory cache, and content management) is instantiated using the framework, it only has an application programming interface (API) service (e.g., an ECM server API service). When the API service receives a request, it routes the request to an appropriate microservice.

In some embodiments, the request is stored in a repository. The master of the master worker module fetches the request/task from the repository and sends it to a queue. A worker of the master worker module fetches the request/task from the queue and processes it. If the queue is full, the application controller module is notified. The application controller module checks the frequency of full queue notification and, if the frequency is high, it launches a new master automatically. If the queue is empty, the worker notifies the application controller module which shuts down the master.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

An ECM server can provide management capabilities for all types of content. The core of an ECM server can be a repository in which the content is stored securely under compliance rules in a unified environment, although content may reside on multiple servers and physical storage devices within a networked computing environment.

Figure 1:
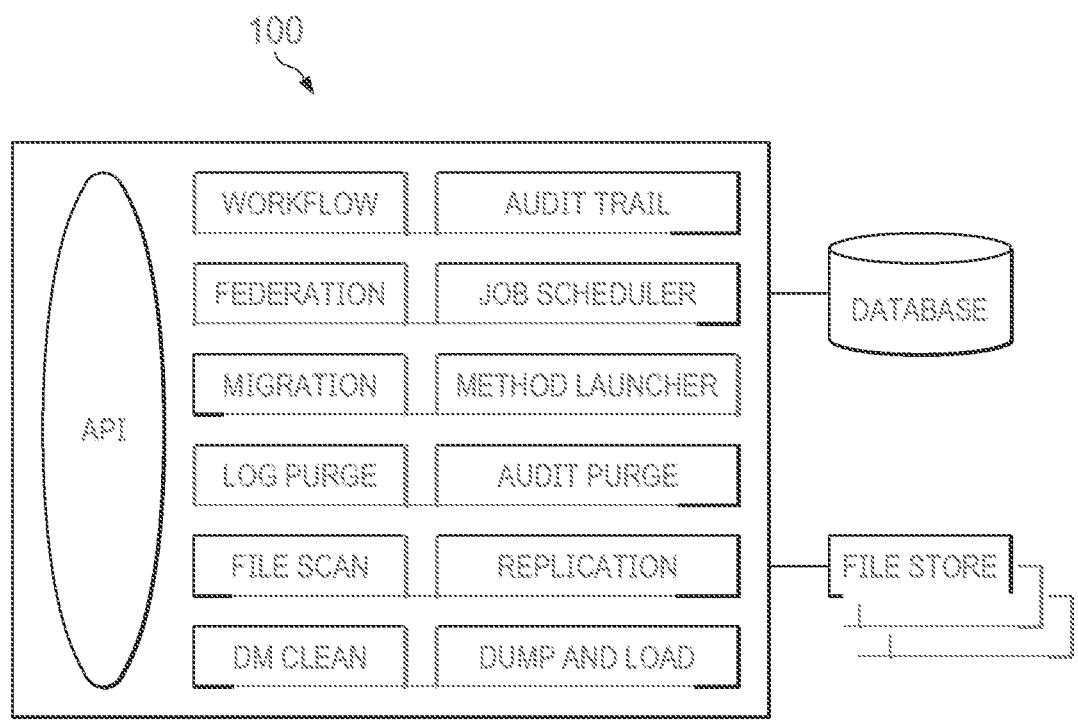
FIG. 1 depicts a diagrammatic representation of an example of a monolithic ECM server architecture in which components implementing the functionalities of an ECM server are contained in a monolithic structure.

FIG. 1 depicts a diagrammatic representation of an example of an ECM server architecture in which components of an ECM server 100 are contained in a monolithic structure (i.e., a container). A container is a standalone, executable package of software that includes everything needed to run an application: code, runtime, system tools, system libraries, and settings.

In the example of FIG. 1, ECM server 100 is configured with modules for the functionalities of ECM server 100, i.e., workflow, federation, migration, log purge, filescan, audit-trail, job scheduler, method launcher, audit purge, and replication. Because ECM server 100 is structured to perform these functionalities at any given time, ECM server 100 has a container size that requires a minimum of 2 GB of storage space and uses at least 8 GB of RAM while deploying and running. This makes applying a patch to ECM server 100 a complex and time consuming operation.

Further, if the load for a specific module is more than other modules in ECM server 100, an administrator or authorized user needs to enable the load balancing and high availability feature before deploying a new ECM server container. Often times, deploying an instance of ECM server 100 requires a new server machine with a huge RAM (e.g., at least 8 GB of RAM) and a large storage space (e.g., at least 2 GB of storage space). In the case of reduced load, ECM server 100 still requires the same huge amount of RAM and storage space to run and consumes the same large amount of resources. Consequently, the ECM server architecture shown in FIG. 1 is not ideal or suitable for scaling.

Figure 2:
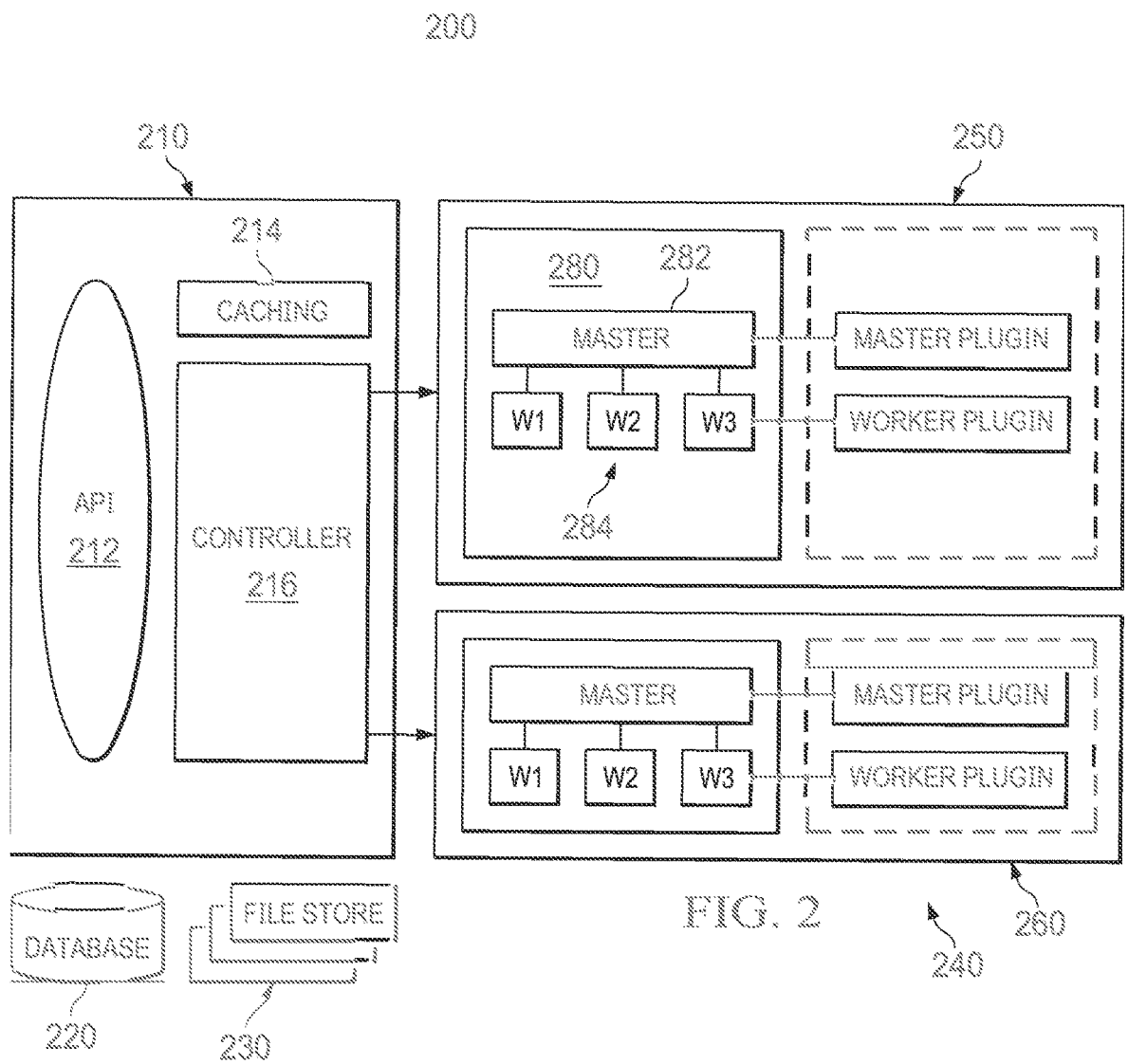
FIG. 2 depicts a diagrammatic representation of an example of a new content server architecture and framework according to some embodiments.

FIG. 2 depicts a diagrammatic representation of an example of a new content server architecture and framework 200 according to some embodiments. In the example of FIG. 2, container 210 is instantiated without all the functionalities of a content server and only has a content server API 212. This makes container 210 a lightweight container.

In the example of FIG. 2, content server API 212 has two components: a caching component 214 and a controller 216. Caching component 214 operates an in-memory cache and controller 216 works with master worker module(s) 240 in framework 200.

In some embodiments, ECM server components, such as those shown in FIG. 1 inside the monolithic structure of ECM server container 100, are decomposed into microservices (e.g., a workflow microservice, a job scheduler service, a file scan service, a migration service, a method launcher service, etc.) provided through framework 200. In computer programming, the term "framework" refers to a universal, reusable computing environment that provides particular functionality as part of a larger computing platform such as an ECM system. A framework usually includes support programs (e.g., for housekeeping), compilers, code libraries, tool sets, and APIs to help bootstrap user applications. Framework implementations are known to those skilled in the art and thus are not further described herein.

As illustrated in FIG. 2, framework 200 defines the overall architecture of a content server. The basic components of framework 200 and the relationships between them remain unchanged in any instantiation of framework 200.

When framework 200 is started up, content server API 212 is started as an ECM API service. The ECM API service receives requests from the client side (e.g., via an object oriented API and framework called "Documentum Foundation Classes" (DFC). DFC is a set of Java classes that make essentially all the ECM server functionalities described above available to client programs through a published set of APIs. DFC allows for accessing, customizing, and extending ECM server functionalities and can be described as an Object-Relational-Mapper for programmatically accessing and manipulating objects stored in a secure content repository.

As a non-limiting example, when a request is received by the ECM API service, controller 216 routes the request to an appropriate microservice in framework 200. In some embodiments, controller 216 is configured for creating instances of active controller applications 240 and for monitoring the load and status (e.g., using caching component 214 to store the load and status metadata in database 220) of each instantiated microservice container (e.g., controller application 250 instantiated by controller 216 from a master worker module 280 in framework 200). If any microservice bad (e.g., for controller application 250) reaches a predetermined load cap, then an additional microservice container (e.g., controller application 260) is instantiated. From this perspective, providing a microservice using framework 200 mainly involves two components: content server API 210 (or, more particularly, controller 216) and master worker module 280 (from which instances of microservices are instantiated as controller applications such as controller applications 250, 260).

As illustrated in the example of FIG. 2, master worker module 280 contains one master 282 and a number of workers 284 to handle the load. Each instance of a controller application 240 has a particular object type (e.g., "dm_controller_app" type) that can be used for keeping track of details of the master, a worker thread count, and plugin details (e.g., using database 220). It can also be used to keep track of current running instances. Other types of metadata such as user attributes, system attributes, application attributes, and so on may also be included and stored in database 220. A non-limiting example list of attributes can be found in Appendix A.

To utilize the microservices provided by framework 200, a user system should have two plugin modules: a master plugin and a worker plugin. The master plugin contains master plugin code for fetching activity requests/tasks from a content server (e.g., a controller application 240), and for sending the activity requests/tasks to a queue. The worker plugin contains worker plugin code for fetching activity requests/tasks from the queue and processing each task by a worker. These plugin detailers should be configured in controller application objects (e.g., objects of the "dm_controller_app" type) along with worker thread counts. Once configured, microservices corresponding to the controller application objects are ready for use.

Figure 3:
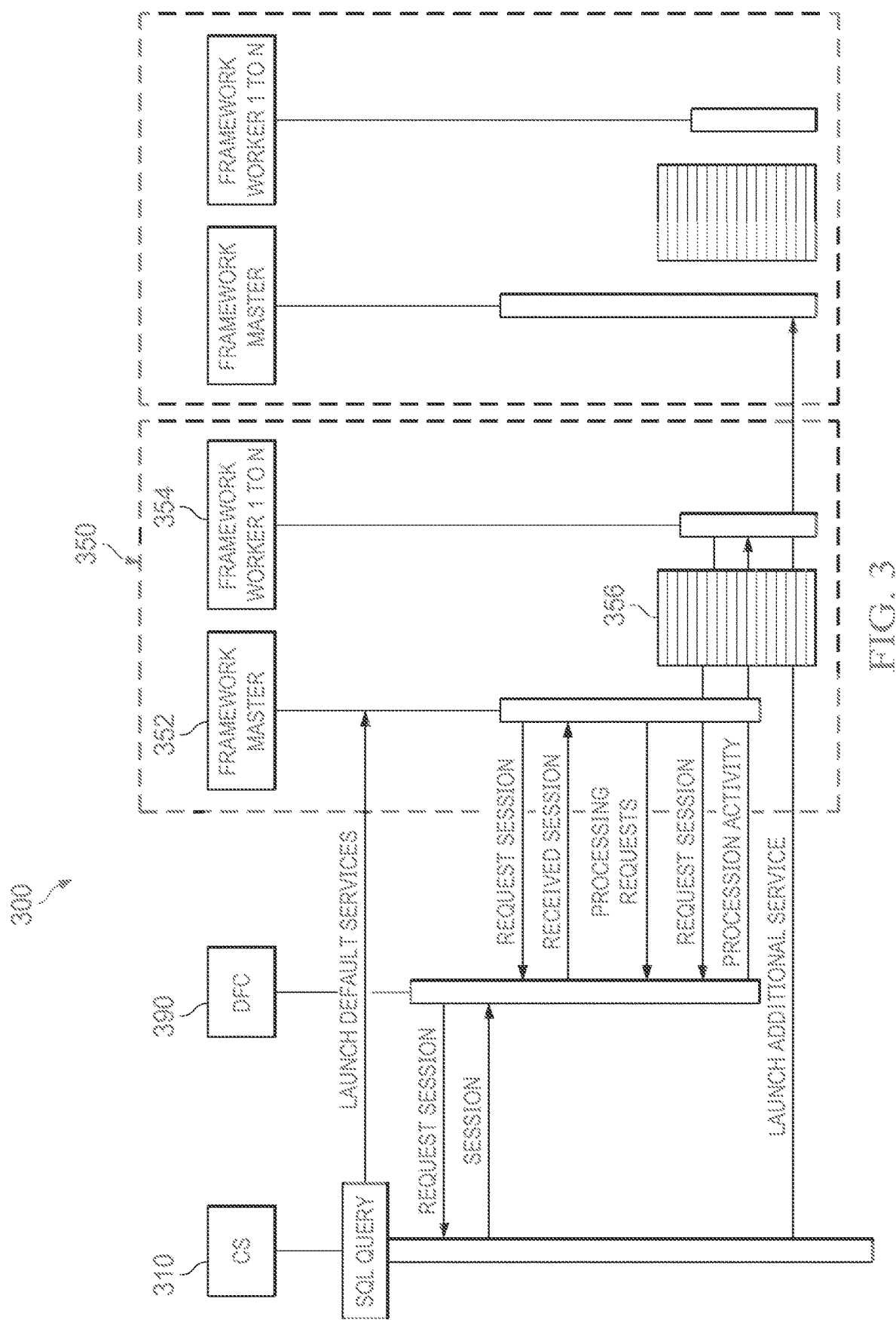
FIG. 3 depicts a sequence diagram illustrating an example of the content server architecture and framework shown in FIG. 2 in operation according to some embodiments.

FIG. 3 depicts a sequence diagram illustrating an example of the content server architecture and framework shown in FIG. 2 in operation according to some embodiments. In the example of FIG. 3, when framework 300 (which defines the overall architecture of a content server) is started up, a content server API service (which is a functionality provided by a content server API in a lightweight container referred to as CS 310 in FIG. 3) and a set of default microservices are launched (e.g., by a controller of the content server API in CS 310). In some embodiments, CS 310 is operable to check its configuration file in an object of the "dm_controller_app" object type), determine which microservices have to be launched, and launch all the specified microservices along with process names. As a non-limiting example, a process name can be an object name followed by an index (e.g., 1, 2, 3), indicating an order by which the process is started.

As illustrated in FIG. 3, CS 310 works with at least two modules—a master module 352 and worker module(s) 354 (which run in a container 350). The number of worker modules in framework 300 can be based on a configuration parameter or metadata in the dm_controller_app object. As a non-limiting example, the default value is 3 worker modules. This default value is configurable.

In some embodiments, CS 310 receives (via its content server API) a request for a content server function from a DFC 390 and routes (via its controller) the request to a microservice in framework 300 that corresponds to the requested content server function. The microservice stores the request in a repository (e.g., file store 230 shown in FIG. 2). Master module 352 retrieves the request from the repository and places the request in a queue 356. A worker 354 picks up the request from queue 356 and processes it.

In some embodiments, the queue size is calculated using a formula below.

Worker thread count (which has a configurable default value of 3)*30 (which is assigned and is not modifiable by a user)=90 tasks per queue by default Accordingly, master module 352 will try to fetch top 90 tasks from the repository and try to put them into queue 356. If queue 356 is full, master module 352 sends a notification back to the controller in CS 310. The controller in CS 310 is operable to check the frequency of the queue full size notification. If the frequency value is high (e.g., as compared to a predetermined threshold value), it launches a new instance of a master-worker module automatically, as shown in FIG. 3.

If queue 356 is not full, then worker threads 354 will fetch tasks from queue 356 and process the tasks one by one. If queue 356 is empty, then the worker module sends a notification to the controller in CS 310 which, in turn, sends a shutdown request to framework 300 to shut down the master module (i.e., to kill container 350, which is an instance of the master module of framework 300).

Embodiments disclosed herein can provide many advantages and benefits. For example, decomposing a monolithic ECM server into smaller microservices can improve modularity, be easy to manage, consume less resources, and provide huge cost savings. For instance, when the framework is started, the container size for a content server is less than 1 GB, which is approximately 50% reduction in container size and the launch speed is approximately 70-80% faster. The reduction in container size and increase in launch speed allows multiple content server containers to be launched at the same time and/or on the same server machine. Further, because ECM functionalities are no longer bound by a monolithic structure and can run as microservices, applying a patch becomes a streamlined, efficient process. If a microservice's load reaches or exceeds a predetermined threshold, the framework can automatically scale up by launching a new instance of the master-worker module. When an instance of the master-worker module is no longer needed (e.g., when its queue is empty), the framework can automatically scale down by killing the instance that is no longer needed. This automated scalability allows the framework to utilize computational resources efficiently and, consequently, eliminate the need for requiring huge memory and storage space for content server deployment.

The new framework architecture described above facilitates containerization of ECM server components in a cloud computing environment, resulting in horizontal scaling of required ECM server components. The new framework architecture also makes a content server application easier to understand, develop, and test, and become more resilient to architecture erosion.

Figure 4:
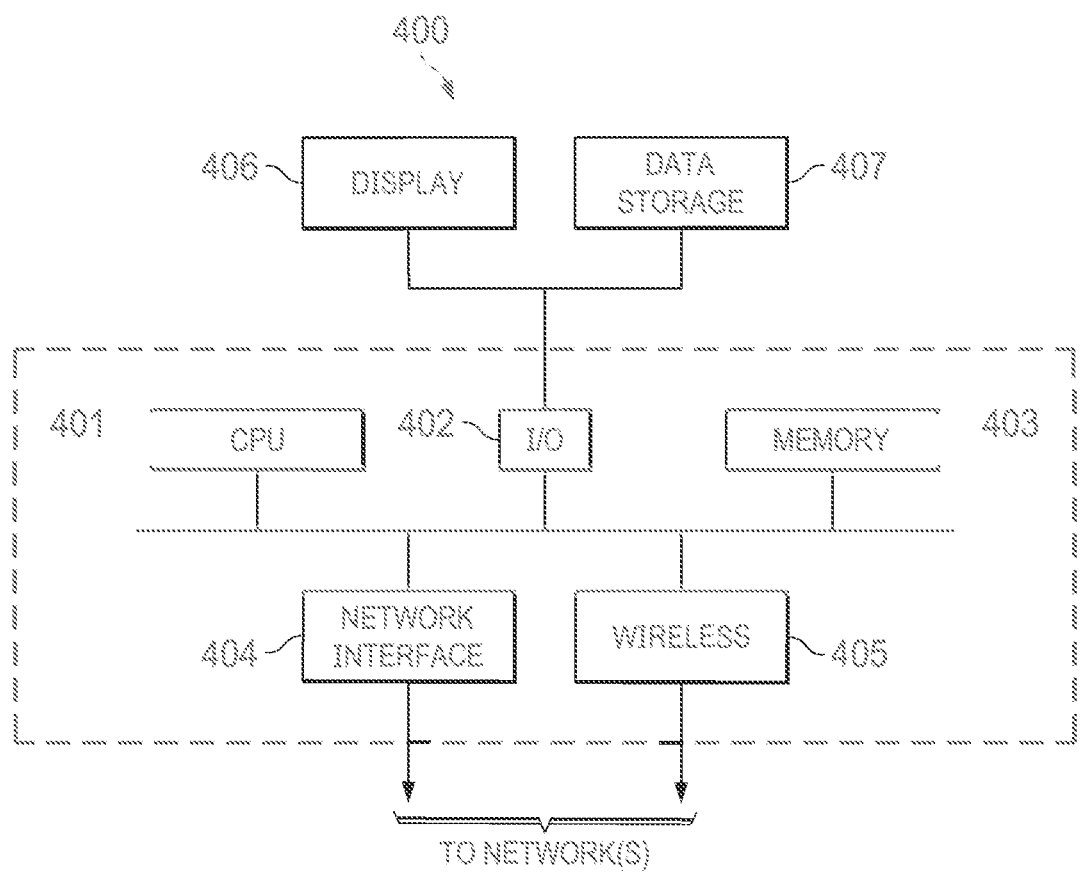
FIG. 4 depicts a diagrammatic representation of a data processing system for implementing an embodiment disclosed herein.

In summary, the new framework and design disclosed herein can help running the following modules as microservices:
Workflow service (a Business Process Management (BPM) process)
Job Scheduling service
Clean service
Migration service
Method Execution service
Audit trail service
Method server service
Easy customizable for each service
This new microservice-based ECM approach can result in the following gain:
Optimized service is load based
Support lightweight containers
Memory optimization
Horizontal Scalable for each service
Services are organized around business capabilities
Easy deployable on service basis FIG. 4 depicts a diagrammatic representation of a data processing system for implementing an embodiment disclosed herein. As shown in FIG. 4, data processing system 400 may include one or more central processing units (CPU) or processors 401 coupled to one or more user input/output (I/O) devices 402 and memory devices 403. Examples of I/O devices 402 may include, but are not limited to, keyboards, displays, monitors, touch screens, printers, electronic pointing devices such as mice, trackballs, styluses, touch pads, or the like. Examples of memory devices 403 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 400 can be coupled to display 406, information device 407 and various peripheral devices (not shown), such as printers, plotters, speakers, etc. through I/O devices 402. Data processing system 400 may also be coupled to external computers or other devices through network interface 404, wireless transceiver 405, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Suitable computer-executable instructions may reside on a non-transitory computer readable medium (e.g., ROM, RAM, and/or HD), hardware circuitry or the like, or any combination thereof. Within this disclosure, the term "non-transitory computer readable medium" is not limited to ROM, RAM, and HD and can include any type of data storage medium that can be read by a processor. Examples of non-transitory computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nano-engineered systems, components, and mechanisms may be used. In general, the functions of the invention can be achieved by any means as is known in the art. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendices, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendices, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. The scope of the present disclosure should be determined by the following claims and their legal equivalents.

What is claimed is:

1. A method, comprising:
   at startup of a content server framework, instantiating a content server container and launching a set of microservices, the content server container consisting of a content server application programming interface (API), the content server API having a controller;
   receiving, by the content server API, a request for a content server functionality;
   routing, by the controller of the content server API, the request to a microservice of the set of microservices in the content server framework, the microservice corresponding to the content server functionality;
   storing, by the microservice, the request in a repository;
   retrieving, by a master module in the content server framework, the request from the repository;
   placing, by the master module, the request in a queue;
   receiving, by the controller, a notification indicating that the queue is full;
   comparing, by the controller, a frequency of notifications from the master module indicating that the queue is full with a predetermined threshold value; and
   responsive to the frequency of notifications indicating that the queue is full meeting or exceeding the predetermined threshold value, launching a new instance of a controller application, the new instance running in a separate container.

2. The method according to claim 1, further comprising:
   at the startup of the content server framework, checking a configuration file; and
   determining the set of microservices from the configuration file prior to launching the set of microservices.

3. The method according to claim 1, further comprising:
   determining, by the master module, whether the queue is full;
   responsive to the queue being full, sending, by the master module, the notification to the controller; and
   retrieving, by a worker of the master module, the request from the queue, wherein the request for the content server functionality is processed by the worker, wherein the master module and the worker operate in a container that is separate from the content server container.

4. The method according to claim 1, further comprising:
   determining, by the master module, whether the queue is full; and
   responsive to the queue being full, sending, by the master module, the notification indicating that the queue is full.

5. The method according to claim 3, further comprising:
   determining, by the worker, whether the queue is empty; and
   responsive to the queue being empty, sending, by the worker, a notification to the controller.

6. The method according to claim 5, further comprising:
   receiving, by the controller, the notification indicating that the queue is empty; and
   sending, by the controller, a shutdown request to the content server framework, wherein the content server framework shuts down the master module in response to the shutdown request.

7. The method according to claim 1, wherein the content server API further comprises a caching component.

8. A system, comprising:
a processor;
a non-transitory computer-readable medium; and
stored instructions translatable by the processor for:
starting up a content server framework, the starting up including instantiating a content server container and launching a set of microservices, the content server container consisting of a content server application programming interface (API), the content server API having a controller, the starting up further including instantiating a controller application having a master module and a worker;
receiving, by the content server API, a request for a content server functionality;
routing, by the controller of the content server API, the request to a microservice of the set of microservices in the content server framework, the microservice corresponding to the content server functionality;
storing, by the microservice, the request in a repository;
retrieving, by the master module, the request from the repository;
placing, by the master module, the request in a queue;
receiving, by the controller, a notification indicating that the queue is full;
comparing, by the controller, a frequency of notifications indicating that the queue is full with a predetermined threshold value; and
responsive to the frequency of notifications indicating that the queue is full meeting or exceeding the predetermined threshold value, launching a new instance of a controller application, the new instance running in a separate container.

9. The system of claim 8, wherein the starting up further includes checking a configuration file and determining the set of microservices from the configuration file prior to launching the set of microservices.

10. The system of claim 8, wherein the stored instructions are further translatable by the processor for:
determining, by the master module, whether the queue is full; and
responsive to the queue being full, sending, by the master module, a notification to the controller.

11. The system of claim 8, wherein the stored instructions are further translatable by the processor for:
determining, by the worker, whether the queue is empty; and
responsive to the queue being empty, sending, by the worker, a notification to the controller.

12. The system of claim 8, wherein the stored instructions are further translatable by the processor for:
retrieving, by the worker, the request from the queue, wherein the request for the content server functionality is processed by the worker, wherein the master module and the worker operate in a container for the controller application that is separate from the content server container.

13. The system of claim 8, wherein the stored instructions are further translatable by the processor for:
receiving, by the controller, the notification indicating that the queue is empty; and
sending, by the controller, a shutdown request to the content server framework, wherein the content server framework shuts down the master module in response to the shutdown request.

14. The system of claim 8, wherein the content server API further comprises a caching component.

15. A computer program product comprising a non-transitory computer-readable medium storing instructions translatable by the processor for:
starting up a content server framework, the starting up including instantiating a content server container and launching a set of microservices, the content server container consisting of a content server application programming interface (API), the content server API having a controller, the starting up further including instantiating a controller application having a master module and a worker;
receiving, by the content server API, a request for a content server functionality;
routing, by the controller of the content server API, the request to a microservice of the set of microservices in the content server framework, the microservice corresponding to the content server functionality;
storing, by the microservice, the request in a repository;
retrieving, by the master module, the request from the repository;
placing, by the master module, the request in a queue;
receiving, by the controller, a notification from the master module indicating that the queue is full;
comparing, by the controller, a frequency of notifications indicating that the queue is full with a predetermined threshold value; and
responsive to the frequency of notifications indicating that the queue is full meeting or exceeding the predetermined threshold value, launching a new instance of a controller application, the new instance running in a separate container.

16. The computer program product of claim 15, wherein the starting up further includes checking a configuration file and determining the set of microservices from the configuration file prior to launching the set of microservices.

17. The computer program product of claim 15, wherein the instructions are further translatable by the processor for:
determining, by the master module, whether the queue is full; and
responsive to the queue being full, sending, by the master module, a notification to the controller.

18. The computer program product of claim 15, wherein the instructions are further translatable by the processor for:
determining, by the worker, whether the queue is empty; and
responsive to the queue being empty, sending, by the worker, a notification to the controller.

19. The computer program product of claim 18, wherein the instructions are further translatable by the processor for:
receiving, by the controller, the notification indicating that the queue is empty; and
sending, by the controller, a shutdown request to the content server framework, wherein the content server framework shuts down the master module in response to the shutdown request.

20. The computer program product of claim 15, wherein the content server API further comprises a caching component.

* * * * *